United States Patent
Karnagel et al.

(10) Patent No.: US 11,615,265 B2
(45) Date of Patent: Mar. 28, 2023

(54) AUTOMATIC FEATURE SUBSET SELECTION BASED ON META-LEARNING

(71) Applicant: Oracle International Corporation, Redwood Shores, CA (US)

(72) Inventors: Tomas Karnagel, Zurich (CH); Sam Idicula, Santa Clara, CA (US); Hesam Fathi Moghadam, Sunnyvale, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 837 days.

(21) Appl. No.: 16/547,312

(22) Filed: Aug. 21, 2019

(65) Prior Publication Data

US 2020/0327357 A1    Oct. 15, 2020

Related U.S. Application Data

(60) Provisional application No. 62/834,166, filed on Apr. 15, 2019.

(51) Int. Cl.
*G06F 16/00* (2019.01)
*G06K 9/62* (2022.01)
*G06N 20/00* (2019.01)

(52) U.S. Cl.
CPC ........... *G06K 9/623* (2013.01); *G06K 9/6257* (2013.01); *G06N 20/00* (2019.01)

(58) Field of Classification Search
CPC .... G06K 9/623; G06K 9/6257; G06K 9/6271; G06N 20/00; G06N 20/20; G06N 5/003; G06N 3/084; G06V 10/771; G06V 10/82
See application file for complete search history.

(56) References Cited

U.S. PATENT DOCUMENTS 6,789,069 B1    9/2004  Barnhill
7,593,903 B2 *  9/2009  Forman ................. G06Q 10/10
                                                                706/12

(Continued)

FOREIGN PATENT DOCUMENTS

EP    2 128 798 A1    12/2009

OTHER PUBLICATIONS

Urbanowicz et al., "Relief-Based Feature Selection: Introduction and Review", Apr. 4, 2018, pp. 1-43 (Year: 2018).*

(Continued)

*Primary Examiner* — Jared M Bibbee
(74) *Attorney, Agent, or Firm* — Hickman Becker Bingham Ledesma LLP; Brian N. Miller

(57) ABSTRACT

The present invention relates to dimensionality reduction for machine learning (ML) models. Herein are techniques that individually rank features and combine features based on their rank to achieve an optimal combination of features that may accelerate training and/or inferencing, prevent overfitting, and/or provide insights into somewhat mysterious datasets. In an embodiment, a computer ranks features of datasets of a training corpus. For each dataset and for each landmark percentage, a target ML model is configured to receive only a highest ranking landmark percentage of features, and a landmark accuracy achieved by training the ML model with the dataset is measured. Based on the landmark accuracies and meta-features values of the dataset, a respective training tuple is generated for each dataset. Based on all of the training tuples, a regressor is trained to predict an optimal amount of features for training the target ML model.

20 Claims, 6 Drawing Sheets

(56) References Cited

U.S. PATENT DOCUMENTS

| | | | |
|---|---|---|---|
| 10,832,158 | B2 | 11/2020 | Liu |
| 2002/0169735 | A1 | 11/2002 | Kil et al. |
| 2008/0097938 | A1 | 4/2008 | Guyon et al. |
| 2016/0358099 | A1 | 12/2016 | Sturlaugson et al. |
| 2018/0022539 | A1 | 1/2018 | Vedani |
| 2018/0046926 | A1* | 2/2018 | Achin ............... G06N 20/20 |
| 2018/0225391 | A1 | 8/2018 | Sali et al. |
| 2018/0357511 | A1 | 12/2018 | Misra et al. |
| 2019/0095756 | A1* | 3/2019 | Agrawal ............ G06K 9/6271 |
| 2019/0121919 | A1* | 4/2019 | Rafaila ............. G06F 30/3323 |
| 2019/0392255 | A1 | 12/2019 | Franklin |
| 2020/0034197 | A1* | 1/2020 | Nagpal ............... G06F 9/50 |
| 2020/0074306 | A1 | 3/2020 | Giral et al. |
| 2020/0082013 | A1* | 3/2020 | Triplet ............. G06K 9/00496 |
| 2020/0118036 | A1 | 4/2020 | Karnagel |
| 2020/0201727 | A1* | 6/2020 | Nie ................... G06N 20/00 |
| 2020/0242400 | A1* | 7/2020 | Perkins ............. G06K 9/6262 |
| 2020/0327448 | A1* | 10/2020 | Yakovlev ............ G06N 20/00 |
| 2020/0380378 | A1* | 12/2020 | Moharrer ........... G06N 20/00 |

OTHER PUBLICATIONS

Marcilio C. P. de Souto et al., "Ranking and Selecting Clustering Algorithms Using a Meta-Learning Approach", IEEE, pp. 3729-3735 (Year: 2008).*

Lin et al., "Experiencing SAX: a novel symbolic representation of time series", dated Apr. 3, 2007, 38 pages.

Abe et al., "Developing an Integrated Time-Series Data Mining Environment for Medical Data Mining", Seventh IEEE International Conference on Data Mining—Workshops, dated 2007, 6 pages.

Ahmed et al., "An Empirical Comparison of Machine Learning Models for Time Series Forecasting", dated Sep. 15, 2010, 31 pages.

Amazon SageMaker, "DeepAR Forecasting Algorithm", https://docs.aws.amazon.com/sagemaker/latest/dg/deepar.html,last viewed on Jun. 29, 2020, 5 pages.

Artificial Intelligence Blog, "Announcing automated ML capability in Azure Machine Learning", dated Sep. 24, 2018, 8 pages.

Brownlee, Jason, "Time Series Forecasting as Supervised Learning", dated Aug. 21, 2019, 2 pages.

Camerra et al., "Beyond one billion time series: indexing and mining very large time series collections with iSAX2+", dated Feb. 16, 2013, 29 pages.

"Machine Learning Approaches for Time Series Data" dated May 19, 2019, 25 pages.

Kraska, Tim, "Northstar: an Interactive Data Science System", Proceedings of the VLDB Endowment, vol. 11, No. 12 Copyright 2018 VLDB Endowment, 15 pages.

Wang et al., "Experimental comparison of representation methods and distance measures for time series data", dated Feb. 12, 2010, 35 pages.

Ng, "Data preprocessing for machine learning: options and recommendations", dated Jun. 22, 2020, 12 pages.

Olson et al., "Evaluation of a Tree-based Pipeline Optimization Tool for Automating Data Science", dated Mar. 20, 2016, 8 pages.

Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.

Paoli et al., "Forecasting of preprocessed daily solar radiation time series using neural networks", Solar Energy, Elsevier, dated 2010, 43 pages.

Plotz et al., "Feature Learning for Activity Recognition in Ubiquitous Computing", dated Jan. 2011, 7 pages.

Schoenfeld et al., "Preprocessor Selection for Machine Learning Pipelines", dated 2018, 7 pages.

Song et al., "Deep r -th Root of Rank Supervised Joint Binary Embedding for Multivariate Time Series Retrieval", KDD 2018, dated Aug. 19-23, 2018, London, United Kingdom, 10 pages.

Faloutsos et al., "Fast Subsequence Matching in Time Series Databases", dated 1998, 11 pages.

Zhu et al., "To prune, or not to prune: exploring the efficacy of pruning for model compression", dated 2017, 11 pages.

Stamoulis et al., "HyperPower: Power- and Memory-Constrained Hyper-Parameter Optimization for Neural Networks", dated 2018, 7 pages.

Sprechmann et al., "Memory-Based Parameter Adaptation", Published as a conference paper at ICLR dated 2018, 16 pages.

Shohoni et al., "Low-Memory Neural Network Training: a Technical Report", Stanford University, dated Apr. 25, 2019, 38 pages.

Prasad et al., "Distributed Feature Selection Using Vertical Partitioning for High Dimensional Data", ICACCI, dated Sep. 12, 2016, 8 pages.

Moran-Fernandez et al., "Centralized vs. Distributed Feature Selection Methods Based on Data Complexity Measures", Knowledge-based Systems, dated Sep. 28, 2016, 20 pages.

Li et al., "Hyperband: a Novel Bandit-Based Approach to Hyperparameter Optimization", Journal of Machine Learning Research 18 (dated 2018) pp. 1-52.

Han et al., "Deep Compression: Compressing Deep Neural Networks With Pruning, Trained Quantization and Huffman Coding", Conference Paper at ICLR dated 2016, 14 pages.

Gelbart et al., "Bayesian Optimization with Unknown Constraints", dated 2014, 10 pages.

Bolon-Canedo et al., "Distributed Feature Selection: an Application to Microarray Data Classification", Applied Soft Computing, dated Feb. 7, 2015, 16 pages.

Yakovlev, U.S. Appl. No. 16/384,588, filed Apr. 15, 2019, Non-Final Rejection, dated Sep. 16, 2021.

Castiello et al., "Meta-data: Characterization of Input Features for Meta-learning", Springer-Verlag Berlin Heidelberg dated 2005, 13 pages.

Albon, Chris, "ANOVA F-Value for Feature Selection", dated Dec. 20, 2017, 2 pages.

Ganapathi, A. et al. "Predicting multiple performance metrics for queries: Better decisions enabled by machine learning", ICDE 2009, 12 pages.

Furnkranz et al., "An Evaluation of Landmarking Variants", dated 2001, 12 pages.

Filchenkjov et al., "Datasets Meta-Feature Description for Recommending Feature Selection Algorithm", dated Nov. 2015, 9 pages.

Feurer et al., "Initializing Bayesian Hyperparameter Optimization via Meta-Learning", Proceedings of the Twenty-Ninth AAAI Conference on Artificial Intelligence dated 2015, 8 pages.

Hutter et al., "Automatic Machine Learning: Methods, Systems, Challenges", dated Oct. 16, 2018, 250 pages.

Chandrashekar et al., "A survey on feature selection methods", Computers and Electrical Engineering 40 dated 2014, 13 pages.

Jennie Duggan et al., .Performance Prediction for Concurrent Database Workloads SIGMOD, dated 2011, 12 pages.

Brown et al., "Conditional Likelihood Maximisation: a Unifying Framework for Information Theoretic Feature Selection", Journal of Machine Learning Research 13 (2012), 40 pages.

Brazdil, Pavel, "Metalearning and Algorithm Selection: Progress, State of the Art and Introduction of the 2018 Special Issue", dated Dec. 2017, 23 pages.

Brazdil et al., "Ranking Learning Algorithms: Using IBL and Meta-Learning on Accuracy and Time Results", dated 2003 Kluwer Academic Publishers. Manufactured in The Netherlands, 27 pages.

Bensusan et al., "Discovering Task Neighbourhoods through Landmark Learning Performances", Springer-Verlag Berlin Heidelberg dated 2000, 6 pages.

Bensusan et al., "Casa Batlo is in Passeig de Gracia or how landmark performances can describe tasks", dated 2000, 19 pages.

B. Debnath et al., SARD: a statistical approach for ranking database tuning parameters. In ICDEW, pp. 11-18, dated 2008.

Duan et al., "Tuning Database Configuration Parameters with iTuned", VLDB dated 2009, 12 pages.

Narayanan et al., "Continuous resource monitoring for self-predicting DBMS", IEEE International Symposium on Modeling, Analysis and Simulation of Computer and Telecommunication Systems, 2005, 10 pages.

(56) References Cited

OTHER PUBLICATIONS

Van Aken et al., "Automatic Database Management System Tuning Through Large-scale Machine Learning," Proceedings of the 2017 ACM International Conference on Management of Data, 2017, pp. 1009-1024.
Sullivan et al., "Using probabilistic reasoning to automate software tuning", In SIGMETRICS, dated 2004, 13 pages.
Reif et al., "Prediction of Classifier Training Time including Parameter Optimization", dated Oct. 2011, 13 pages.
Reif et al., "Meta-learning for evolutionary parameter optimization of classifiers, Machine Learning", dated 2012, 24 pages.
Pudil et al., "Floating Search Methods in Feature Selection", dated Jun. 19, 1993, 9 pages.
Guyon et al., "An Introduction to Variable and Feature Selection", Journal of Machine Learning Research 3 dated 2003, 26 pages.
Narendra et al., "A Branch and Bound Algotithm for Feature Subset Selection", IEEE Transactions on Computers, vol. C-26, No. 9, dated Dec. 1977, 6 pages.
Zilio, D.C.A. "DB2 design advisor: integrated automatic physical database design" VLDB dated 2004, Proceedings of the Thirtieth international conference on Very large data bases, 11 pages.
Molina et al., "Feature Selection Algorithms: a Survey and Experimental Evaluation", dated 2002, 19 pages.
Microsoft Docs, "Feature Selection Modules", dated May 5, 2019, 7 pages.
Lindne et al., "AST: Support for Algorithm Selection with a CBR Approach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Kohavi, Ron, "Wrappers for Performance Enhancement and Oblivious Decision Graphs", dated Sep. 1995, 304 pages.
Peskova et al., "Hybrid Multi-Agent System for Metalearning in Data Mining", dated Sep. 19, 2014, 2 pages.
Singh et al., "Literature Review on Feature Selection Methods for High-Dimensional Data", International Journal of Computer Applications, vol. 136, No. 1, dated Feb. 2016, 9 pages.
Parmezan et al., "Metalearning for Choosing Feature Selection Algorithms in Data Mining: Proposal of a New Framework", Preprint submitted to Expert Systems with Applications, Nov. 4, 2016, 66 pgs.
Microsodt Docs, "Feature Selection in the Team Data Science Process", dated Nov. 20, 2017, 5 pages.
Li et al., "Feature Selection: a Data Perspective", AMC, Computer Suru 9, Article 39, dated Mar. 2010, 45 pages.
Krupka et al., "Learning to Select Features using their Properties", Journal of Machine Learning Research 9, dated 2008, 28 pages.
Yogatama et al., "El cient Transfer Learning Method for Automatic Hyperparameter Tuning", Proceedings of the 17th International Conference on Artifical Intelligence and Statistics dated 2014, 9 pages.
Thornton et al., "Auto-WEKA: Combined Selection and Hyperparameter Optimization of Classification Algorithms", New York, New York, dated Mar. 6, 2013, 9 pages.
Swersky et al., "Multi-Task Bayesian Optimization", dated 2013, 9 pages.
Kim et al., "Learning to Transfer Initializations for Bayesian Hyperparameter Optimization", 31st Conference on Neural Information Processing Systems dated 2017, Long Beach, CA, USA, 5 pages.
Jomaa et al., "Dataset2Vec: Learning Dataset Meta-Features", dated May 5, 2019, 23 pages.
Hutter et al., "Sequential Model-Based Optimization for General Algorithm Configuration", Conference on the Theory and Applications of Cryptographic Techniques, dated Jan. 17, 2011. 17 pages.
Feurer et al., "Using Meta-Learning to Initialize Bayesian Optimization of Hyperparameters", dated 2014, 8 pages.
Feurer et al., "Initializing Bayesian Hyperparameter Optimization via Meta-Learning", dated 2015, 8 pages.
Bardenet et al., "Collaborative hyperparameter tuning", Proceedings of the 30 th International Conference on Machine Learning, Atlanta, Georgia, USA, 2013, 9 pages.
Amasyali et al., "A Study of Meta Learning for Regression", http://docs.lib.purdue.edu/ecetr, dated Jul. 1, 2009, 26 pages.
Wang et al., "A Feature Subset Selection Algorithm Automatic Recommendation Method", Journal of Artificial Intelligence Research 47, 2013, 34 pages.
Ridd et al., "Using Metalearning to Predict When Parameter Optimization Is Likely to Improve Classification Accuracy", MLAS '14, 2014, 6 pages.
Molina et al., "Meta-Learning Approach for Automatic Parameter Tuning: a Case Study with Educational Datasets", Proceedings of the 5th International Conference on Educational Data Mining, 2012, 4 pages.

\* cited by examiner

AUTOMATIC FEATURE SUBSET SELECTION BASED ON META-LEARNING

BENEFIT CLAIM

This application claims the benefit under 35 U.S.C. § 119(e) of provisional application 62/834,166, filed Apr. 15, 2019, the entire contents of which is hereby incorporated by reference for all purposes as if fully set forth herein.

FIELD OF THE INVENTION

The present invention relates to dimensionality reduction for machine learning (ML) models. Herein are techniques that individually rank features and combine features based on their rank to achieve an optimal combination of features that may accelerate training and/or inferencing, prevent overfitting, and/or provide insights into somewhat mysterious datasets.

BACKGROUND

Machine learning (ML) achieves artificial intelligence (AI) by reinforcement learning, which occurs during training of a ML model. A ML model in training is exposed to dataset(s) of a training corpus. A (e.g. training) dataset contains many examples of a same natural object type (e.g. photograph, console log entry, or database record). All examples of a type have (e.g. distinct) values for a same set of features. For example, each photo may have its own average luminosity and count of detected edges or objects, all of which are features of photos. An ML model, such as a regressor or classifier, such as an artificial neural network (ANN) or a decision tree, may train based on features of examples within a training dataset, or inference based on features of a new example.

Use of ML, such as deep learning (DL), is rapidly spreading through industries and business units and is becoming a ubiquitous tool within some corporations. ML model training may be resource intensive of time and/or space of a computer. An ML model may be configured to process all features that occur in a dataset. However, processing of each feature may cost substantial computer resources. Efficiency may be increased when the ML model does not process some features. However, not all features are logically and/or logistically equal. Indeed, a performance increase may need intelligent selection of which features to process and which features to ignore.

Feature selection may have a strong impact on model performance (e.g., accuracy, f1 score, etc.). Selecting a model's optimal feature subset is exponentially hard and can be extremely time consuming especially for intricate datasets. Because there are $2^n$ possible subset combinations (n=number of features), considering all possible subsets is infeasible. For example, a dataset may have a hundred thousand features.

The main problem is the number of possible feature subsets for a given dataset. In theory, it would be best to evaluate every possible subset, by training and scoring a ML model using cross-validation or a validation test set, and determining the best subset based on the resulting score (e.g. accuracy). However, this is infeasible with the number of features ranging from a few to hundreds of thousands. The state of the art entails too many exploratory evaluations (i.e. training and testing with a feature subset), which is the most time-consuming part of feature selection.

The following are various previous approaches, all of which have a limited ability to manage the numerosity/combinatorics of possible feature subsets for a given dataset. Filter approaches, based on statistical analysis of feature values and perhaps ignoring the ML model itself, may be prone to deleting important features such as when a filter method or a threshold is inappropriate for the given dataset or ML model involved. With embedded approaches, which leave feature selection to the learning ability of the ML model, processing many features still results in a large model training time or a tendency to overfit, thereby detracting from the two main motivations for feature selection. A serious challenge for wrapper approaches, which treat an ML model as a black box whose sensitivity to features must be empirically explored, is defining feature subsets to evaluate. The main problem with most of the above approaches is that an ideal number of features (i.e. target subset size) is typically unknown beforehand.

DETAILED DESCRIPTION

Figure 1:
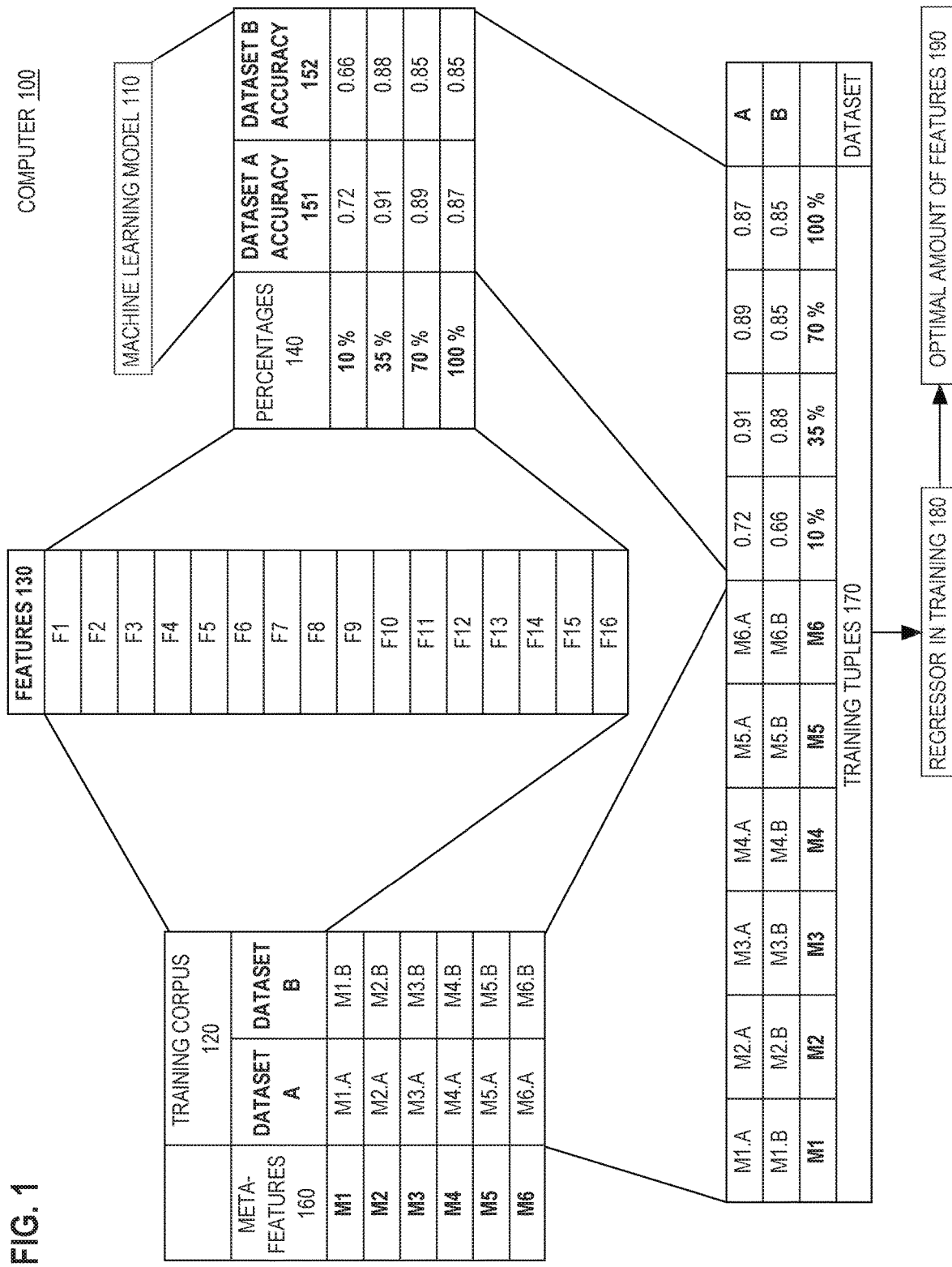
FIG. 1 is a block diagram that depicts an example computer that trains a regressor to predict how many is an optimal amount of features for training a machine learning (ML) model with a new dataset.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Each training sample may have many features, and consideration of each feature adds complexity to a machine learning (ML) model that may consume computer training time and space and, in some cases, degrade the accuracy of the trained ML model. Thus, ignoring some features may increase training efficiency, such as reduce training time. Different features may have different magnitudes of impact upon the accuracy of the ML model. For example, some features may be more or less decisive, and other features may be more or less irrelevant. Thus, feature selection (i.e. deciding which features to analyze and which features to ignore) can accelerate training, without reducing accuracy, so long as the features are intelligently chosen.

Feature selection may have various uses, such as reducing dataset size, reducing overfitting, training acceleration, and better understanding the data. Feature selection entails choosing a subset of features and training an ML model with that subset, and (e.g. with state of the art) repeating until an optimal subset is found. That may entail generation and comparison of many distinct subsets, which may be more or less intractable unless intelligent heuristics can propose fewer and better feature subsets. Indeed, there are $2^n$ (i.e. exponential) possible subset combinations (n=number of features). Exhaustive exploration (i.e. considering all possible subsets) is infeasible for larger number of features.

Feature-based ranking can be used to consider only subsets with more important features, which are those features that are well correlated to the inferences and accuracy of the ML model. Techniques herein use meta-learning (i.e. machine learning by one ML model upon performance metadata about another ML model) to predict a most promising feature subset based on a very few landmark subset evaluations, thus reducing the number of subsets for evaluation (i.e. training), and therefore accelerate training.

Approaches herein combine feature ranking criteria with a key improvement: learning how to predict an optimal amount of features to train with based on a few landmark subsets of features. Techniques herein can be directly applied to any (e.g. Oracle) machine learning product that supports feature selection. Exploratory landmark search significantly improves overall runtime. Especially in cloud applications, less runtime means less resource usage and cost. Approaches may apply the following novel techniques to automatically select features.

Sometimes a single ranking algorithm cannot fully assess feature importance for all possible datasets. Thus, multiple ranking algorithms may be used to complement each other in an embodiment. Each ranking algorithm produces a feature ranking that defines landmark feature subsets for evaluation according to a ranking order. Additionally, there may be an ensemble ranking that combines multiple feature rankings into a new ranking. For example, an ensemble ranking can be based on an average of feature scores of all other rankings.

In an embodiment, a computer calculates, for each feature of a training dataset, a relevance score based on: a relevance scoring function, and statistics of values, of the feature, that occur in the training dataset. A rank based on relevance scores of the features is calculated for each feature. An optimal subset of the features, based on the ranks of the features, is predicted.

With exploratory landmark search, instead of evaluating many feature subsets or applying a sequential search, a few landmark percentages of features are used for preliminary exploration. This entails selecting very few subsets of features, all based on feature ranking order. The relative size difference is more significant between the few predetermined percentages. For example, having a dataset with 100 features, it would be desirable to test a 10-feature subset, even knowing that a 20-feature subset is good, because it would reduce the size by half. Whereas, if a 70-feature subset was found as good, the potential reduction with an 60-feature subset is not significant enough to justify training more landmarks. Thus, a few very different landmark percentages may efficiently survey a feature subsets landscape.

Despite this approach, the full dataset (subset with all features) may be additionally selected as a 100% landmark for evaluation in case of the following:

The ranking does not reflect the real feature importance, or

All or nearly all features are important for the prediction.

With exploratory landmark search/evaluation, feature subsets are chosen by inspecting a given feature ranking and without any step-wise evaluation beforehand. Thus, composing a subset is fast (i.e. not computationally intensive). Time-consuming evaluation can then be done in parallel by training and testing a target model with the selected landmark subsets. Because these subsets are independent, parallelism can scale up to the number of evaluated landmark subsets. Even without high parallelism, this approach facilitates load balancing with the intrinsic knowledge that smaller landmark subsets can be evaluated faster than larger landmark subsets due to the reduction of the dataset size. For example, one computer may evaluate the two smallest landmark subsets, while another computer evaluates the biggest landmark subset.

An improvement over the state of the art is the use of meta-learning to predict an ideal feature subset size (i.e. number of features to process). For example, naïve feature selection needs exponential time to explore n features. A ranking algorithm produces a ranked list of n features ordered by their importance, which can be used to reduce how many feature subsets are evaluated, from exponential to n, to linear or even logarithmic to n. Whereas, techniques herein achieve feature selection in constant time by predicting an ideal subset size i and only test this subset, which is the i-length prefix of the list of features as ordered by the ranking. That reduces the number of tested subsets from $O(n)$ to $O(1)$. If multiple ranking algorithms are used (r different algorithms), then the evaluated subsets are reduced from $O(r*n)$ to $O(r)$. Especially in public cloud deployments, approaches herein can save on variable costs by reducing consumption of metered computer resources. Especially during research and development, approaches herein can accelerate time to market.

In an embodiment, a computer ranks features of datasets of a training corpus. For each dataset and for each landmark percentage, a target ML model is configured to receive only the highest ranking landmark percentage of features, and a landmark accuracy achieved by training the ML model with the dataset is measured. Based on the landmark accuracies and meta-features values of the dataset, a respective training tuple is generated for each dataset. Based on all of the training tuples, a regressor is trained to predict an optimal amount of features for training the target ML model.

1.0 Example Computer

FIG. 1 is a block diagram that depicts an example computer 100, in an embodiment. Computer 100 trains regressor 180 to predict how many is optimal amount of features 190 for training a machine learning (ML) model 110 with a new dataset (not shown). Computer 100 may be one or more of a rack server such as a blade, a personal computer, a mainframe, a virtual computer, or other computing device.

Computer 100 may store, within its memory, ML model 110. Depending on the embodiment, ML model 110 is designed for clustering, classification, regression, anomaly detection, prediction, or dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as scikit-learn (sklearn), Google's TensorFlow for Python and C++ or Georgia Institute of Technology's MLPack for C++. Shogun is an open source C++ ML library with adapters for several programing languages including C#, Ruby, Lua, Java, MatLab, R, and Python.

The lifecycle of ML model 110 has two phases. As shown, the first phase is preparatory and entails training, such as in a laboratory. The second phase (not shown) entails inferencing in a production environment, such as with live and/or streaming data.

During inferencing, ML model 110 is applied to a (e.g. unfamiliar) sample, which may be injected as input into ML model 110. That causes ML model 110 to process the sample according to the internal mechanics of ML model 110, which are specially configured according to reinforcement learning by ML model 110 during previous training. For example if ML model 110 is a classifier, then ML model 110 may select one of multiple mutually exclusive labels (i.e. classifications) for the sample, such as hot and cold.

Whether during training or inferencing, ML model 110 processes samples that may have different values for same features such as F1-F16. For example, feature F1 may be color, and feature F2 may be temperature. Each sample may have a same or different color and a same or different temperature.

Depending on how rich (i.e. multidimensional) are sample data, there may be many more (e.g. hundreds or thousands) features than shown F1-F16. ML model 110 may have one of many ML model types, and those model types typically have ample logical flexibility to accept and process the very many features of sample data such as training corpus 120. However, consumption of resources such as time and/or space may be positively correlated with the numerosity or complexity of available features.

For example, values of features 130 for one sample may be encoded as a feature vector. Features 130 may be numerous, for which each sample's feature vector would be very wide (i.e. memory intensive). For example, each feature may be encoded as a multi-byte machine word that is interpreted according to the kind of feature. For example, enumerated values of a category feature such as a month of a calendar year or a color of a limited palette may be integer encoded by ordinal. For example, every key of any encoding dictionary has its own ordinal. Ordinal encoding may be dense (i.e. integer) or sparse (i.e. bit mapped, one hot). Although more space intensive by an order of magnitude, one hot encoding may increase model accuracy, such as 151-152 that are discussed below.

Operational costs, such as those based on feature vector width, may linearly scale with numerosity of features 130. Such linear costs may include latency(s) of computation and/or data transfer, such as with producing and/or consuming feature vectors.

There may be practical limits as to how many features can ML model 110 process within a given resource budget. Thus in practice, some features should be ignored. However, deciding how many and which features to ignore may impact how accurate can ML model 110 become.

ML model accuracy is an objective metric that may account for a frequency and/or severity of errors such as misclassifications. For example, a binary classifier may have respective frequencies of false positives and false negatives, which may have different semantic severities. For example, mistaking a red traffic light as green may be worse than mistaking a green light as red.

Some features may be noisy or otherwise more or less irrelevant to an inference or inference accuracy. Other features may be more or less correlated to the performance of ML model 110. As follows, computer 100 may train regressor 180 to predict how many of features F1-F16 could be relevant.

Training ML model 110 may entail processing many samples (not shown), which reinforcement learning typically needs. Together, these samples may form a training corpus, such as 120. As shown, training corpus 120 has at least datasets A-B. Each dataset may have many samples. For example, each sample may be a photograph, a piece of prose, a database record, a whole spreadsheet or a row within, or other document such as extensible markup language (XML), JavaScript object notation (JSON), or hypertext markup language (HTML).

Samples have many features 130, including F1-F16 as shown in training corpus 120. Computer 100 has one or more scoring functions (not shown) that each calculate, for each of features F1-F16, a relevance scores that estimates how much impact might a feature have upon the accuracy of ML model 110.

In an embodiment, a relevance score of a feature is merely an estimate and not based on actual performance of ML model 110. Thus, scoring function(s) may score features F1-F16 without actually operating ML model 110. In such embodiments, scoring function(s) may operate regardless of whether ML model 110 is trained or not, and may operate in the absence of ML model 110.

Thus depending on the embodiment, the relevance scores of features F1-F16 may be calculated by scoring function(s) with no input other than training corpus 120. For example, scoring function(s) may calculate a relevance score for feature F1 based solely on the values in one attribute (i.e. data field) of a sample (e.g. record) of training corpus 120. Scoring function(s) may calculate a relevance score that is based on a statistic of the values of a feature, such as variance.

Training herein is supervised. Thus, each training sample also has a classification label, as shown in training corpus 120, or other prediction target that ML model 110 may be trained to infer. A feature may be more or less correlated to (i.e. predictive of) the label. For example, most blue samples may be labeled as positive.

Thus, blue may be somewhat predictive of positive and, more generally, color may be somewhat predictive of the classification label. Scoring function(s) may calculate a relevance score that is based on correlation of a feature to the label. In an embodiment, correlation may be calculated according to statistics such as mutual information or F score as discussed later herein. Features that somewhat correlate with classification may have a higher relevance score.

Although ML model 110 may be untrained, scoring function(s) may be based on a configuration of a different ML model (not shown) that is already trained. For example, some kinds of ML models naturally rank features according to relevance/importance. For example with a trained random forest ML model, each feature has a learned feature importance as presented later herein.

Likewise with a trained logistic regression ML model, each feature has a learned feature coefficient. In an embodiment, scoring function(s) may be sensitive to the learned importance or coefficient of a feature. For example, scoring function(s) may use one learned coefficient when scoring feature F1 and use a different learned coefficient when scoring feature F2, although both coefficients come from a same trained regressor (not shown).

Learned feature importance according to an unshown trained model may increase efficiency, such as when the unshown model can be trained much faster than ML model 110 could be trained. For example, the unshown model may have used a much smaller training corpus than 120 or a small subset of 120.

As explained above, there are various (e.g. many) ways to calculate a relevance score of a feature. In an embodiment, scoring function(s) integrates multiple statistics or inputs for a same feature. In an embodiment, each statistic may have its own scoring function, and the scores from multiple functions are integrated to derive an aggregate (e.g. mean) relevance score of a feature. Complexity of scoring may be encouraged because scoring function(s) are applied only once to features 130, and that one-time build-time cost may be amortized across the production life of ML models 110 and/or 180.

Once all features F1-F16 have relevance scores, the features can be comparatively ranked according to relevance score. For example, features F1-F16 may be ranked by descending relevance score. For example, feature F3 may be most important (i.e. rank 1), and feature F2 may be less important (e.g. rank 3). As discussed later herein, features F1-F16 may be redundantly scored by different scoring functions to produce different rankings.

When only one scoring function is available, relevance scores need not be normalized. However, when multiple score functions are used, the scores that they calculate may need (e.g. unit) normalization.

In this example, there is only one ranking, such that features may be ordered by decreasing relevance as F3, F1, F2, and so on. Ranking improves the efficiency and effectiveness of feature selection. Without ranking, feature selection may entail exploration that is naturally combinatoric, which can expand exponentially according to a count of available features. Thus, optimal feature selection may be computationally intractable without heuristics such as rank.

Rank indicates feature relevance. Less relevant features may be ignored more or less without impacting accuracy of ML model 110. For example, datasets A-B may each be a spreadsheet. Each row of a spreadsheet may be a training sample. Thus, less relevant features are ignored by ignoring some columns of each spreadsheet. Thus for ML model 110, each training row may lack many or most of available features F1-F16. Thus, training ML model 110 may be accelerated by training only with relevant features.

A short coming is that accuracy of ML model 110 may depend on training corpus 120. As trained, ML model 110 may achieve good accuracy only for data that is more or less similar to that of training corpus 120. For example, ML model 110 may detect ears in photos as trained, which may be inaccurate for dog photographs that differ from those of cat photo training corpus 120. Thus, a new instance of the same kind of model as ML model 110 should be trained to handle a new dataset, such as different photographs.

Furthermore, a different amount of relevant features of features 130 may be relevant to a ML model instance for cat photos than for dog photos. For example, the ML model instance for dogs may need the ten most relevant features for detecting ears. Whereas, ML model 110 for cats may need only the five most relevant features to achieve same accuracy at ear detection.

Thus, it is significant that regressor 180 can be trained to predict optimal amount of features 190 that are relevant for a new dataset (not shown) that is not part of training corpus 120. Training of regressor 180 is based on training tuples 170. Each row of training tuples 170 is a training sample. In an embodiment, each of those rows is encoded as a feature vector.

There is one row of training tuples 170 per dataset A-B of training corpus 120. Each row of training tuples 170 records training accuracies 151-152 achieved by ML model 110 for a respective dataset A-B for various predetermined amounts of features F1-F16. The various predetermined amounts are a few predetermined percentages 140 of features 130, shown as 10, 35, 70, and 100 percent. Those few predetermined percentages 140 are known herein as landmarks.

Predetermination of landmark percentages 140 may depend on numerosity of features 130, such as the following scheme that expects to select four landmark percentages. If features 130 has only one feature, then 100% is the only landmark percentage. Because that is only one landmark, but four are expected, the remaining landmarks may default to an accuracy of zero.

If features 130 has only two features then, in addition to a 100% landmark, there also is a 35% landmark that has one feature. Again, an expected amount of landmarks may be achieved by synthesizing a few landmarks that have an accuracy of zero. If features 130 has only three features then, in addition to a 100% landmark, there is a 35% landmark with one feature and a 70% landmark with two features. If features 130 has only four features then, addition to a 100% landmark, there is a 10% landmark with one feature and a 70% landmark with two features. When features 130 has at least as many features as expected landmarks, then percentages such as 10%, 35%, 70%, and 100% may be directly arithmetically calculated. For example, 10% of 50 features is 5 features in the 10% landmark.

Selecting ML model 100's optimal feature subset by brute force (i.e. exhaustive combinatoric elaboration) is exponentially hard and can be extremely time consuming especially for intricate datasets. Because there are $2^n$ possible subset combinations (n=number of features), considering all possible subsets is infeasible. For example, a dataset may have a hundred thousand features.

Landmarks are a very low cost preliminary exploration of that exponential combinatoric space of feature subsets. State of the art feature subset exploration may entail dozens, hundreds, or thousands of trainings of ML model 110. Whereas as shown, only four landmark (i.e. percentages 140) trainings of ML model 110 are needed per dataset A-B.

For example if features 130 has a hundred features, then the four landmark trainings for dataset A or B entail feature subsets having 10, 35, 70, and 100 features of features 130. For example as shown, ML model 110 was only able to achieve 72 percent accuracy for dataset A accuracy 151. Whereas, 85 percent accuracy was achieved for dataset B accuracy 152 when all (i.e. 100%) of features 130 were used. Those landmark results for a respective training dataset are included in each row of training tuples 170. Depending on the embodiment, accuracy may comprise a precision, a recall, or an F score.

Training samples within training corpus 120 each have their own values of features 130. That is, values of features 130 regard individual samples. Whereas, values of meta-features 160 regard a dataset as a whole. For example, meta-feature M1 may be a count of photos. If dataset A has more photos than dataset B, then meta-feature value M1.A is greater than value M1.B. An engineer may (e.g. manually) identify important features M1-M6 and provide logic for calculating values of M1-M6 for any dataset, such as A-B.

In addition to landmark accuracies, training tuples 170 also contain values of meta-features M1-M6 for a respective dataset for each row of training tuples 170. Thus, training tuples 170 contains information about each dataset A-B and the dataset's accuracy landmarks. Thus, regressor 180 may learn to predict optimal amount of features 190 based on dataset meta-features and a few performance landmarks.

As presented later herein, after regressor 180 is trained with training tuples 170, an embodiment may finally select a most relevant feature subset. Computer 100 or another computer may immediately or eventually configure ML model 110 to expect that feature subset. For example, ML model 110 may be configured to expect features F1 and F3, but not F2 nor F4-16.

The following is an example format for training tuples 170. For example, each row of training tuples 170 may be encoded as a feature vector that contain the following fields. Fields marked as "classification only" are only included if ML model 110 is a classifier (e.g. not a regressor). The accuracies are landmarks. The other fields are dataset meta-features.
  Number of instances/data points (i.e. samples) in the dataset (n_instances);
  Number of features in the dataset (n_features);
  Dimensionality: n_features/n_instances
  Number of categorical/non-numeric features in the dataset;
  Number of numeric features in the dataset;
  Number of classes in dataset (classification only);
  Number of instances for the least common class (minority_class_size) (classification only);
  Number of instances for the most common class (majority_class_size) (classification only);
  minority_class_size/majority_class_size (classification only);
  Accuracy with 10% of the features;
  Accuracy with 35% of the features;
  Accuracy with 70% of the features; and
  Accuracy with 100% of the features.

Various embodiments may achieve various thresholds that may elude the state of the art, in theory or practice, such as the following:
  Training corpus 120 may have more than a hundred datasets;
  Numerosity of meta-features 160 may exceed six;
  As shown, numerosity of landmark percentages 140 may be ten or less; and/or
  As shown, there may be more meta-features 160 than landmark percentages 140.

2.0 Example Prediction Training Process

Figure 2:
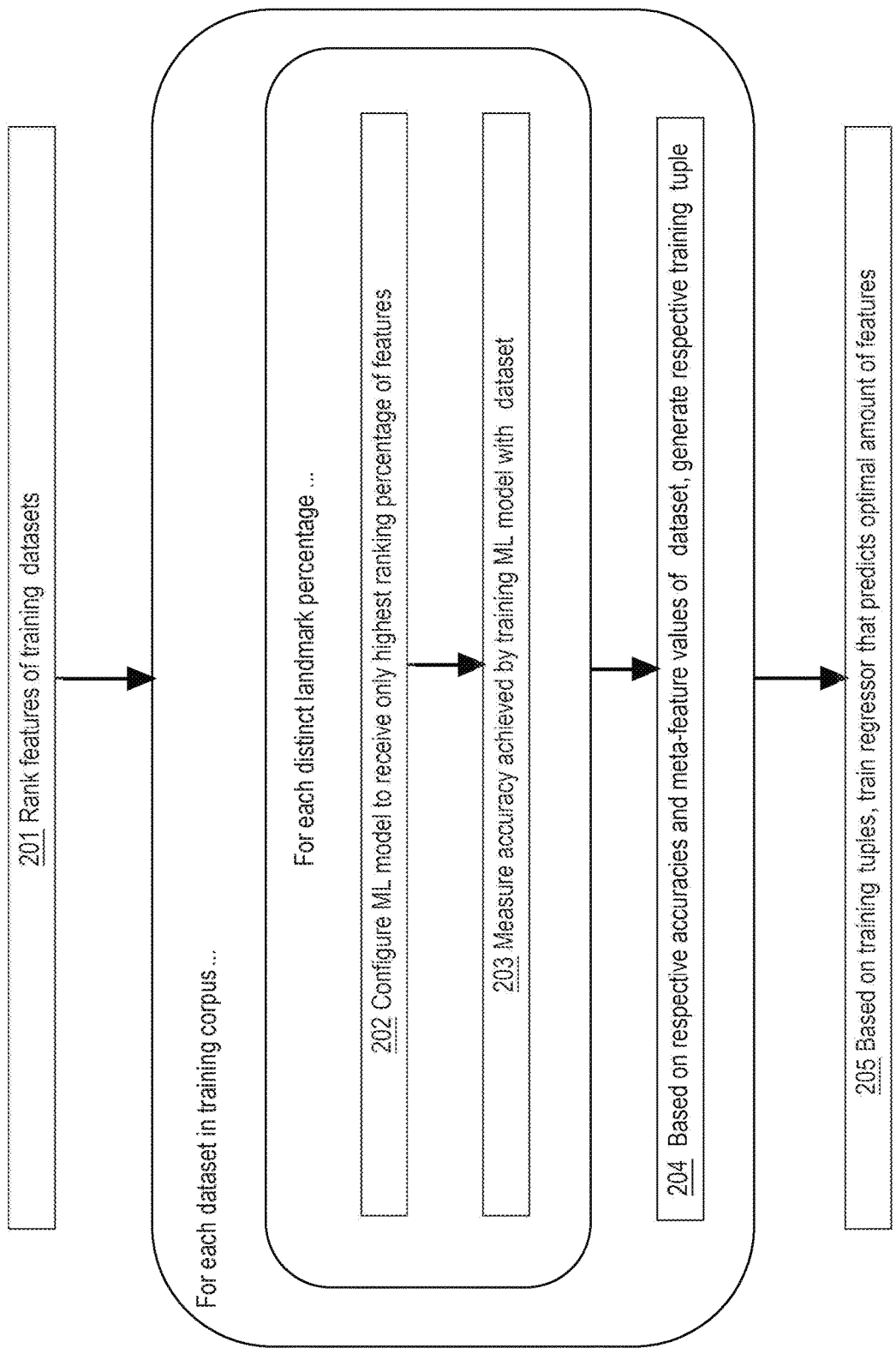
FIG. 2 is a flow diagram that depicts an example computer process for training a regressor to predict how many is an optimal amount of features for training a ML model with a new dataset.

FIG. 2 is a flow diagram that depicts computer 100 training regressor 180 to predict how many is optimal amount of features 190 for training a machine learning (ML) model 110 with a new dataset (not shown), in an embodiment. FIG. 2 is discussed with reference to FIG. 1.

Step 201 is preparatory. Exploratory (i.e. landmark) training of ML model 110 occurs during steps 202-203. Step 205 actually trains predictive regressor 180.

Step 201 ranks, by relevance, features 130 of the samples in training datasets A-B of training corpus 120 as discussed earlier herein. Generation of the few landmark accuracies occurs by training ML model 110 in steps 202-203. Steps 202-203 are repeated for each landmark percentage of percentages 140 and for each of training datasets A-B.

Step 202 configures ML model 110 to accept only a most relevant subset of features 130 based on the current landmark percentage of percentages 140. For example if features 130 has 100 features, and the current landmark percentage is 35 percent, then step 202 configures ML model 110 to accept only the 35 most relevant features of features 130.

Step 203 trains ML model 110 based on the landmark (i.e. feature subset) determined in step 202. For example, ML model 110 is trained with all of the training samples in training corpus 120, but using only a relevant subset of features. Step 203 measures the training accuracy achieved for that landmark and records that accuracy into an entry within either accuracy 151 or 152, depending on which of dataset A-B is the current dataset.

Step 203 is the slowest step because it entails training ML model 110 with all of the training samples in training corpus 120, which may be voluminous. Steps 202-203 are repeated for each distinct pairing of training dataset and landmark percentage. One way to accelerate that is to perform steps 202-203 for all such pairings in parallel, so long as each pairing has its own instance of ML model 110 to independently train. For example, accuracies 151-152 are eight accuracies for each of eight trainings, each based on a distinct pairing of dataset and percentage. Those eight trainings may simultaneously occur, because their operations are inherently independent.

Step 204 is repeated for each training dataset A-B in training corpus 120. When all landmark trainings have occurred for a training dataset, then step 204 may generate a tuple (i.e. row) for that dataset in training tuples 170. For example, training with all datasets A-B may occur in parallel, and each dataset may have a synchronization barrier that waits for all trainings of that dataset to finish and then generate a tuple for that dataset in training tuples 170. Each training tuple contains values of meta-features M1-6 and landmark accuracies for that dataset.

Step 205 may wait for all trainings of ML model 110 to finish for all datasets A-B. For example if such trainings occur in parallel, then a synchronization barrier may detect completion of either: all trainings for all datasets, or generation of all tuples in training tuples 170. In either case, training tuples 170 should then be fully populated with one row per training dataset. There should be many training datasets and many training tuples 170.

Step 205 uses training tuples 170 to train regressor 180 to predict optimal amount of features 190. The complexity of step 205 does not depend on a total count of available features 130 in training corpus 120. That is, neither the width nor height of training tuples 170 depends on how many features are originally available. In that sense, training complexity of regressor 180 is independent of how many features are originally available.

The result of steps 201-205 is a fully trained regressor 180 that, without further training, can predict how many features would be optimal for configuring and training ML model 110 for a new dataset. For example, the learned configuration of regressor 180 may be saved to a file. In a (e.g. live) production environment, that file may be used to more or less instantly materialize (i.e. instantiate) an already trained regressor 180 for predictive inferencing as presented later herein.

3.0 Predictive Inferencing

Figure 3:
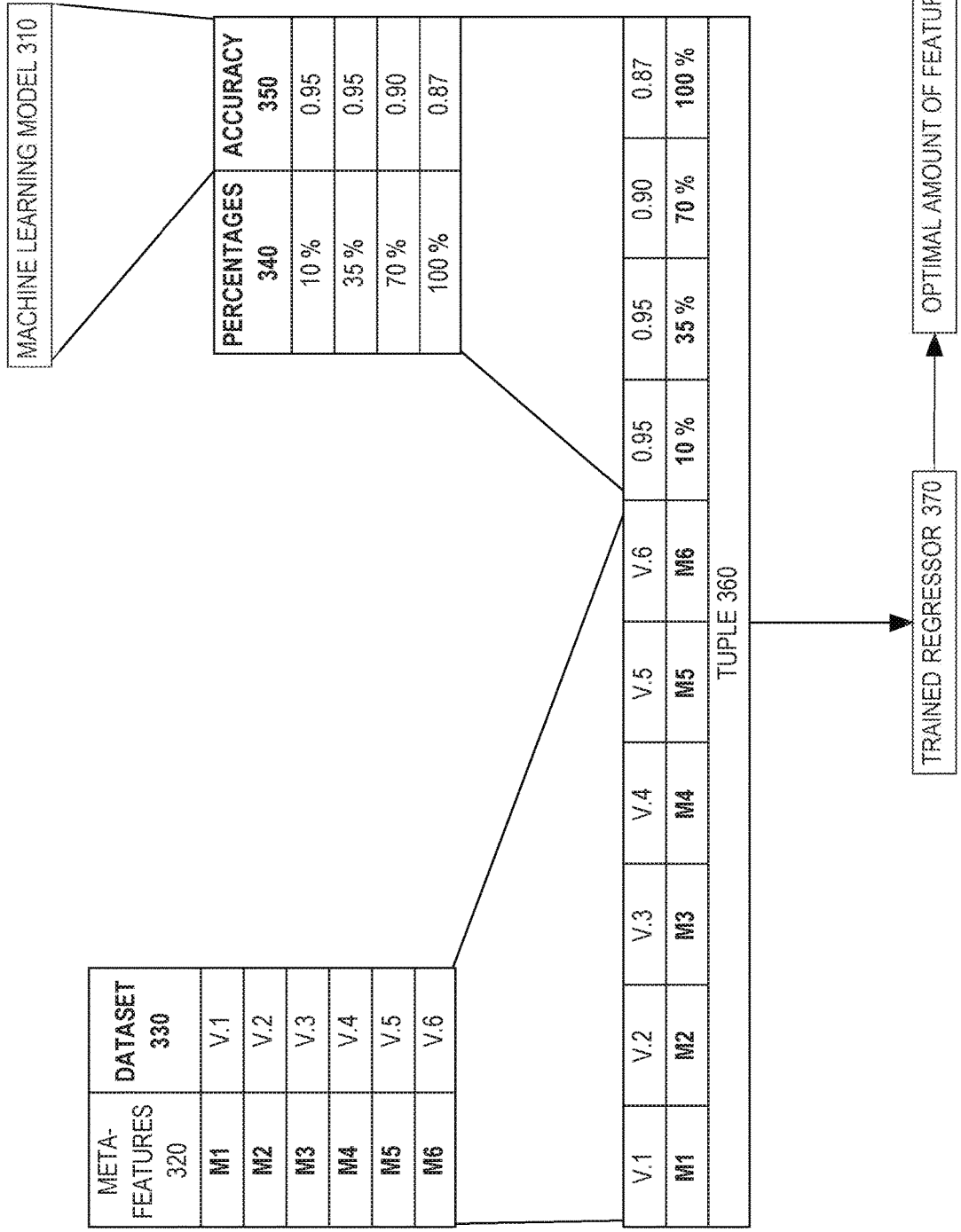
FIG. 3 is a block diagram that depicts an example computer that uses an already trained regressor in a production environment to predict an optimal amount of features for a new dataset.

FIG. 3 is a block diagram that depicts an example computer 300, in an embodiment. Computer 300 uses already trained regressor 370 in a production environment to predict optimal amount of features 380 for new dataset 330. Computer 300 may be an implementation of computer 100.

Dataset 330 is new, such that neither ML models 310 nor 370 have encountered it before. Computer 300 may process new dataset 330 as follows. Dataset 330 is directly analyzed to discover values V.1-6 for respective meta-features M1-6.

Because regressor 370 was already trained, there is no set of training tuples. Instead, operation of trained regressor 370 for production inferencing (i.e. prediction) for new dataset 330 need only consume single input tuple 360, which has a same format as training tuples (not shown) consumed by regressor 370 during training. For example, meta-feature values V.1-6 are recorded into input tuple 360 to characterize new dataset 330.

ML model 310 undergoes some training with new dataset 330, but only for landmark percentages 340 of features (not shown) of dataset 330. Achieved landmark accuracies 350 for dataset 330 are recorded into tuple 360. Thus, input tuple 360 characterizes dataset 330 and the performance landscape of dataset 330.

Trained regressor 370 is applied to tuple 360 to perform inferencing to calculate optimal amount of features 380. For example, even though the four landmarks may, for a hundred available features, reveal accuracies for 10, 35, 70, and 100 feature subsets, inferencing by regressor 370 may predict a somewhat interpolated optimal amount of features 380, such as 20. Furthermore, predicting optimal amount of features 380 is performed by regressor 370 based only on some meta-feature values V.1-6 and a few landmarks in tuple 360.

The complexity of that inference and the width of tuple 360 do not depend on how many features were originally available for samples within new dataset 330. Thus, feature count does not affect the complexity of predicting optimal amount of features 380. Thus, a cost of optimally configuring and thoroughly training ML model 310 with new dataset 330 is minimized. Thus, the cost of needing a separately trained ML model instance, such as 310, for each new dataset is greatly diminished. Indeed, a smaller optimal amount of features 380 yields a greater savings of time needed to optimally configure and thoroughly train ML model 310 with new dataset 330.

4.0 Example Prediction Process

Figure 4:
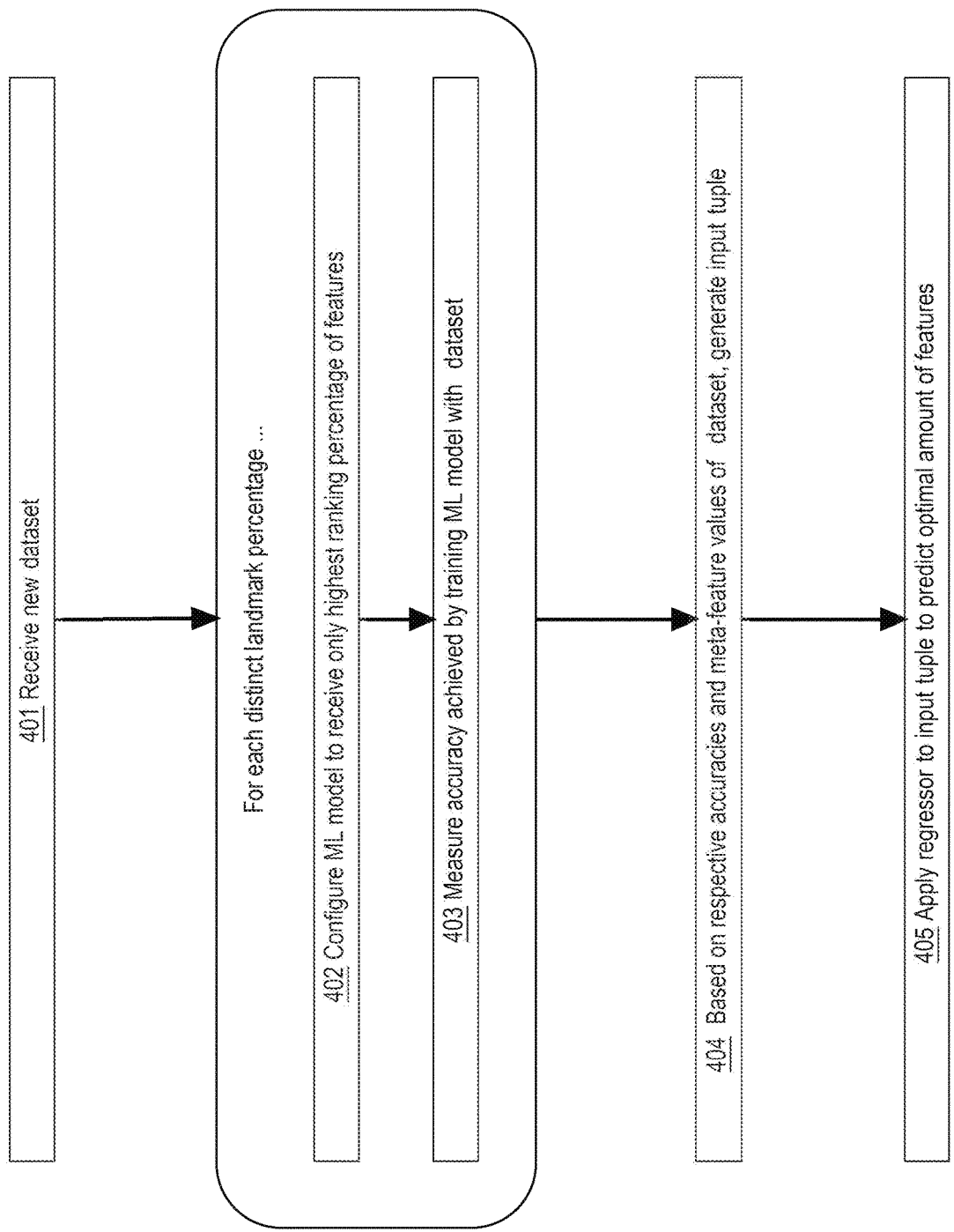
FIG. 4 is a flow diagram that depicts an example computer process for using an already trained regressor in a production environment to predict an optimal amount of features for a new dataset.

FIG. 4 is a flow diagram that depicts computer using already trained regressor 370 in a production environment to predict optimal amount of features 380 for new dataset 330, in an embodiment. FIG. 4 is discussed with reference to FIG. 3.

The process of FIG. 4 need not rank features (not shown), because regressor 370 is already trained, and feature ranking already occurred before such training. Which features are more relevant and which features are included in which landmark subset of some percentage of features was likewise already determined before regressor 370 was trained. Thus, production computer 300 already knows which features are included in which landmarks. However, training accuracy of those landmarks for new dataset 330 is yet to be determined, which occurs later during steps 402-403.

Step 401 causes remaining steps 402-405. Step 401 receives new dataset 330. Step 401 may analyze new dataset 330 to extract or otherwise derive values V.1-6 for meta-features M1-M6. After step 401, computer 300 has more or less all information needed to assess landmarks during exploratory training of ML model 330 during steps 402-403.

Steps 402-403 are repeated for each landmark percentage. All of the few percentages may be simultaneously processed, so long as each percentage has its own instance of ML model 310 to independently train. Step 402 configures ML model 310 to accept only a most relevant subset of features 130 based on the current landmark percentage of percentages 340. For example if dataset 330 has 100 features, and the current landmark percentage is 35 percent, then step 402 configures ML model 310 to accept only the 35 most relevant features of dataset 330.

Step 403 trains ML model 310 based on the landmark (i.e. feature subset) determined in step 402. For example, ML model 310 is trained with all of the training samples in dataset 330, but using only a relevant subset of features. Step 403 measures the training accuracy achieved for that landmark and records that accuracy into an entry within accuracy 350. Based on accuracies 350 and meta-feature values V.1-6 of dataset 330, step 404 generates input tuple 360 as shown.

Step 405 applies regressor 370 to input tuple 360 to predict optimal amount of features 380 for training ML model 310 with dataset 330. For example if regressor 370 is a multilayer perceptron (MLP) having two layers, then input tuple 360 is applied to an input layer of the MLP, the results of which are applied to an output layer of the MLP, and the output layer predicts optimal amount of features 380.

5.0 Example Implementations

The following example embodiments are discussed with reference to FIGS. 1-4. As discussed, there are two ML models 310 and 370 that have somewhat interrelated lifecycles, which may be regarded together as a single bigger combined lifecycle that has three phases, and each phase has two parts. A first phase, as shown in FIGS. 1-2, entails exploratory landmark training of ML model 110 followed by actual training of regressor 180. A second phase, as shown in FIGS. 3-4, entails actual prediction, which entails more exploratory landmark training of ML model 310 with a new dataset followed by predictive inferencing by regressor 370.

What is not shown is a third phase that actually prepares (e.g. in a laboratory) and then, in production, uses ML model 310 with live data. The third phase configures, based on predicted optimal amount of features 380, and fully trains ML model 310 with relevant features of samples in at least small dataset 330 or preferably with a larger dataset from which 330 is merely one partition (e.g. fold). For example in an embodiment, the larger dataset is folded into multiple same sized partitions for cross validation.

In a robust embodiment, ML model 310 is trained with small dataset 330, and an empirical accuracy is measured. If that accuracy does not exceed a most accurate landmark that also was trained with dataset 330, then: a) predicted optimal amount of features 380 is ignored, and b) the feature subset of that most accurate landmark is accepted as optimal and used to configure and train ML model 310. In an embodiment, numerosity of features 130 does not affect the complexity of: a) training and measuring accuracy of the target ML model, b) predicting an optimal amount of features, and/or c) selecting a (e.g. landmark or optimal) subset of features.

In embodiments such as a computer cloud, there need not be separate environments for laboratory training and production inferencing. Indeed, the full lifecycles of the target ML model and the predictive regressor may be collocated on a single computer. For example in a public cloud there may concurrently be exploratory landmark training for a first customer, regressor training for a second customer, actual model training for a third customer, and inferencing for a forth customer.

In an embodiment, ranking(s) may be based on some or all of the following named mathematical artifacts that are provided by the python sklearn library:

- Mutual information (mutual_info_classif, mutual_info_regression)
- Analysis of variation (ANOVA) F score (f_classif, f_regression)
- feature_importances of a trained RandomForestClassifier or RandomForestRegressor feature_importances of a trained AdaBoostClassifier or AdaBoostRegressor For example, a ML model may be used for classifying an input as one of several mutually exclusive discrete classes (e.g. circle, rectangle), or for regression that yields a continuous output (e.g. a house value based on comparable houses). Correlation between a feature and the prediction target (i.e. label) can be measured as an ANOVA F score based on the ratios of their variances In an embodiment, there are multiple (e.g. discrepant) rankings of the features by different ranking functions. In an embodiment, each ranking contributes a same amount of landmarks. For example instead of one ranking with four landmarks, there may be twelve landmarks, with each of three rankings contributing four landmarks based on a same four distinct percentages.

In an embodiment, a ranking identifier is also encoded into a landmark tuple. In an embodiment, each ranking has its own predictive regressor that is trained only with landmark tuples of that ranking. In an embodiment, a final feature subset is a (e.g. truncated) union of feature subsets predicted by the many regressors.

In an embodiment, predicted optimal feature amounts by the multiple regressors are (e.g. arithmetic or geometric) averaged into a single predicted amount, and/or outlier (e.g. excessive variance) constituent predictions are discarded (i.e. ignored). In an embodiment, the average is weighted by accuracy, or a most accurate regressor is selected.

In addition to the target ML model, which may be opaque (i.e. black box), the transparent internals of another ML model may provide feature importances. For example, the following ML models have feature transparency. A random forest model is an ensemble of different decision trees. Adaptive boosting (AdaBoost) is another ensemble model in which constituent models (e.g. decision trees) are each differently specialized for respective extreme examples that would be peculiar and difficult for a single generalized model to accurately inference. Transparency may provide natural ML explainability (MLX), which is visibility into the internal structure or operation of an ML model such that an inference/prediction by the ML model can be readily audited/explained.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
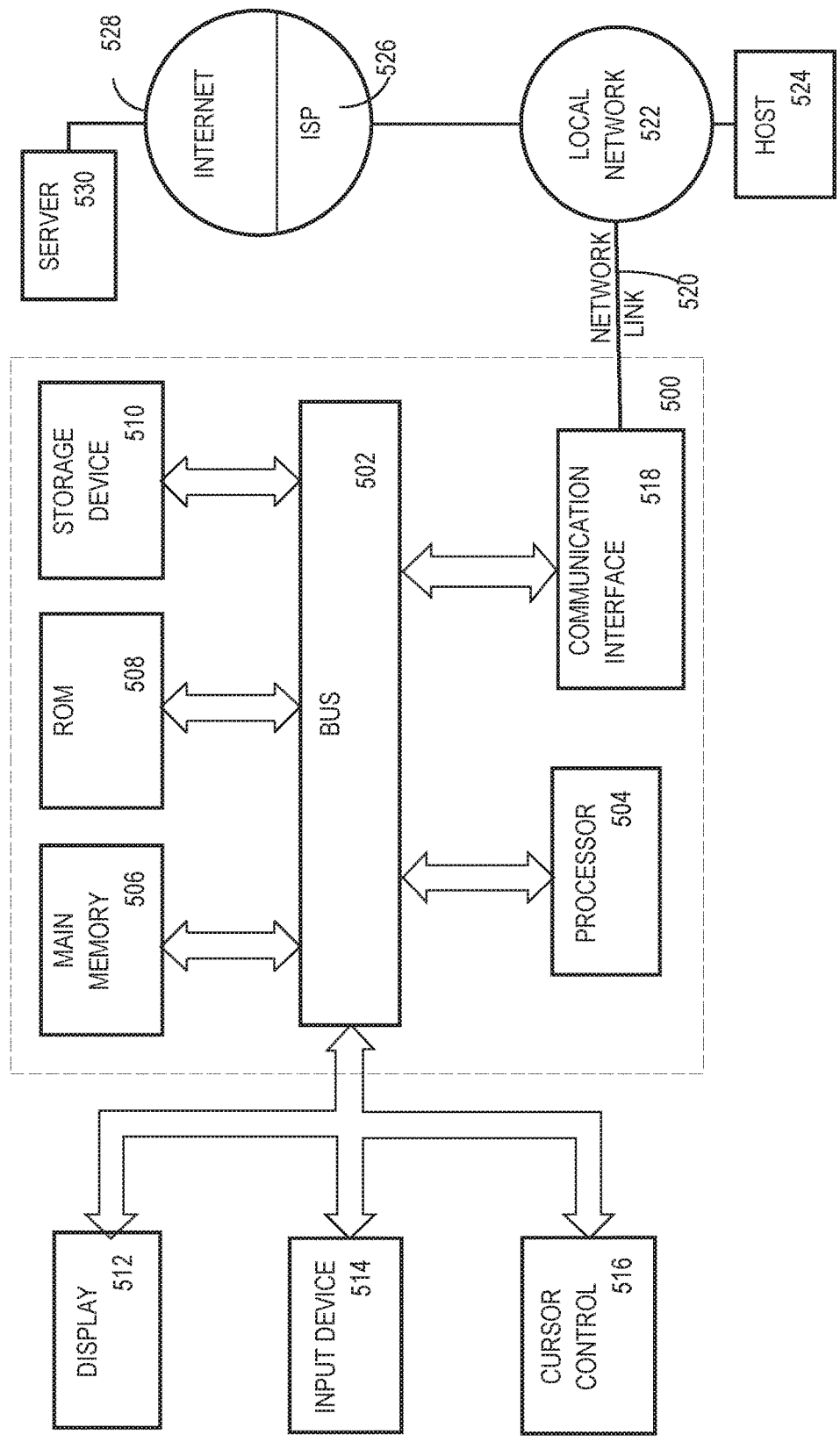
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
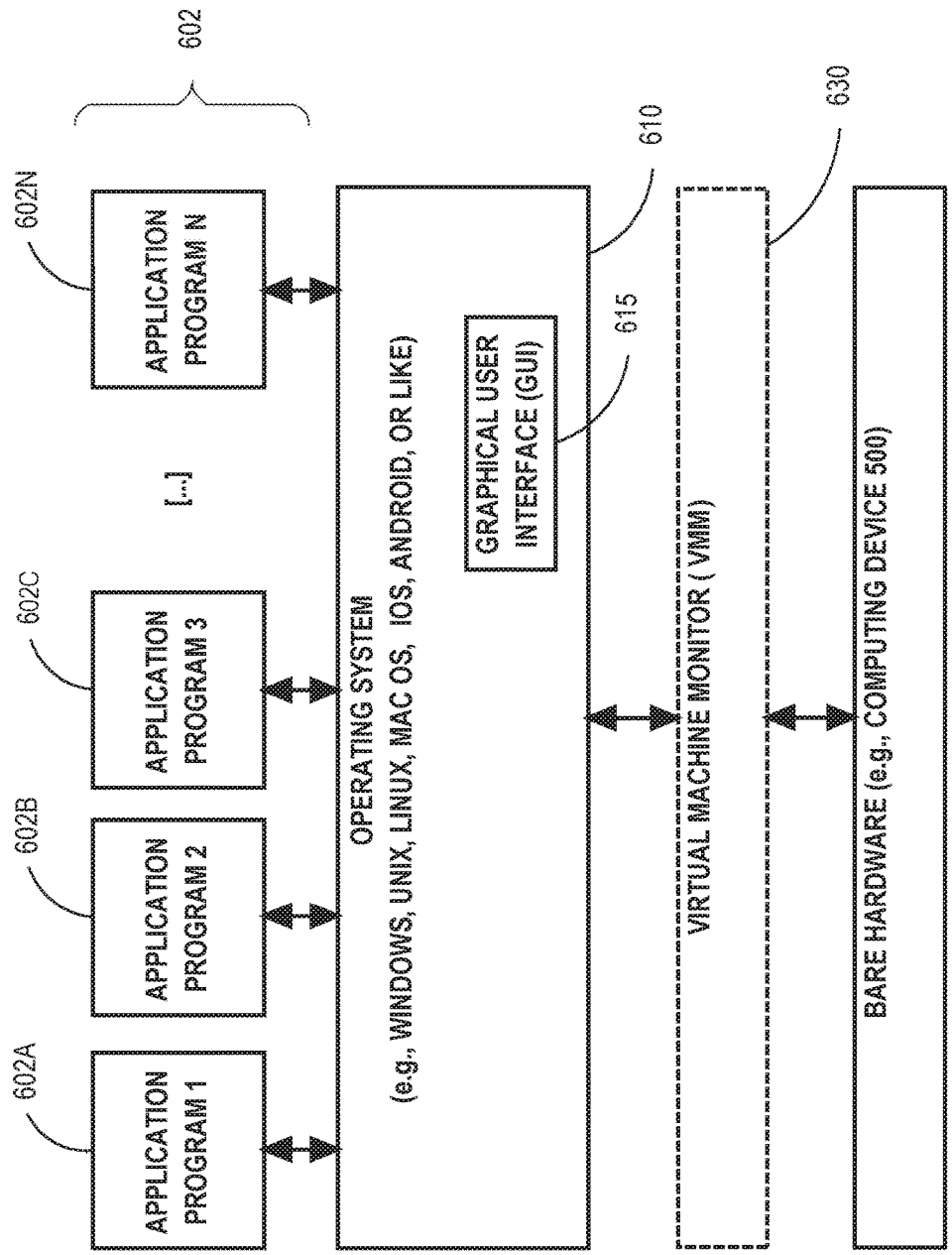
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature F2 ootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
ranking a plurality of features of a plurality of datasets;
for each dataset of the plurality of datasets:
for each percentage of a plurality of distinct percentages:
configuring a machine learning (ML) model to receive only a highest ranking said percentage of the plurality of features, and
measuring an accuracy, of a respective plurality of accuracies, achieved by training the ML model with the dataset; and
generating, based on a plurality of meta-features values of the dataset, a respective tuple of a plurality of training tuples that contains the respective plurality of accuracies; and
training, based on the plurality of training tuples that contain respective pluralities of accuracies, a regressor that predicts a count of features of the plurality of features to configure the ML model to be most accurate.

2. The method of claim 1 further comprising:
receiving a new dataset;
for each percentage of the plurality of distinct percentages:
configuring the ML model to receive only a highest ranking said percentage of the plurality of features, and measuring a new accuracy, of a new plurality of accuracies, achieved by training the ML model with the new dataset; and generating, based on the new plurality of accuracies and a new plurality of meta-features values of the new dataset, a new tuple;

predicting, by the regressor and based on the new tuple, a new count of features of the plurality of features.

3. The method of claim 2 further comprising:

configuring the ML model to receive only a highest ranking said new count of features of the plurality of features;

measuring an empirical accuracy achieved by training the ML model with the new dataset and said highest ranking said new count of features;

selecting a subset of the plurality of features based on the empirical accuracy and the new plurality of accuracies.

4. The method of claim 3 wherein a size of the plurality of features does not affect complexity of said selecting the subset of the plurality of features.

5. The method of claim 1 wherein said predicts the count of features of the plurality of features comprises:

predicts a percentage of the plurality of features, or predicts an optimal subset of the plurality of features.

6. The method of claim 1 wherein:

said ranking the plurality of features comprises a plurality of rankings of the plurality of features;

said for each dataset comprises for each dataset and each particular ranking of the plurality of rankings;

said highest ranking said percentage of the plurality of features comprises said highest ranking by the particular ranking;

said predicts said count of features of the plurality of features comprises predicts a respective count of features for each particular ranking of the plurality of rankings.

7. The method of claim 1 wherein the regressor comprises a random forest.

8. The method of claim 1 wherein a count of the plurality of datasets exceeds one hundred.

9. The method of claim 1 wherein the plurality of meta-features values of each dataset of the plurality of datasets comprises at least one selected from the group consisting of:

a count of the plurality of features that are numeric, a count of the plurality of features that are not numeric, a ratio of the count of the plurality of features to the count of samples in the dataset, a count of classes of samples in the dataset that the ML model can recognize, a minority count of samples in the dataset of a least frequent class of said classes, a majority count of samples in the dataset of a most frequent class of said classes, and a ratio of the minority count to the majority count.

10. The method of claim 1 wherein the accuracy comprises: a precision, a recall, or an F score.

11. One or more non-transitory computer-readable storage media storing instructions that, when executed by one or more processors, cause:

ranking a plurality of features of a plurality of datasets;

for each dataset of the plurality of datasets:

for each percentage of a plurality of distinct percentages:

configuring a machine learning (ML) model to receive only a highest ranking said percentage of the plurality of features, and measuring an accuracy, of a respective plurality of accuracies, achieved by training the ML model with the dataset; and generating, based on a plurality of meta-features values of the dataset, a respective tuple of a plurality of training tuples that contains the respective plurality of accuracies; and training, based on the plurality of training tuples that contain respective pluralities of accuracies, a regressor that predicts a count of features of the plurality of features to configure the ML model to be most accurate.

12. The one or more non-transitory computer-readable storage media of claim 11 wherein the instructions further cause:

receiving a new dataset;

for each percentage of the plurality of distinct percentages:

configuring the ML model to receive only a highest ranking said percentage of the plurality of features, and measuring a new accuracy, of a new plurality of accuracies, achieved by training the ML model with the new dataset; and generating, based on the new plurality of accuracies and a new plurality of meta-features values of the new dataset, a new tuple;

predicting, by the regressor and based on the new tuple, a new count of features of the plurality of features.

13. The one or more non-transitory computer-readable storage media of claim 12 wherein the instructions further cause:

configuring the ML model to receive only a highest ranking said new count of features of the plurality of features;

measuring an empirical accuracy achieved by training the ML model with the new dataset and said highest ranking said new count of features;

selecting a subset of the plurality of features based on the empirical accuracy and the new plurality of accuracies.

14. The one or more non-transitory computer-readable storage media of claim 13 wherein a size of the plurality of features does not affect complexity of said selecting the subset of the plurality of features.

15. The one or more non-transitory computer-readable storage media of claim 11 wherein said predicts the count of features of the plurality of features comprises:

predicts a percentage of the plurality of features, or predicts an optimal subset of the plurality of features.

16. The one or more non-transitory computer-readable storage media of claim 11 wherein:

said ranking the plurality of features comprises a plurality of rankings of the plurality of features;

said for each dataset comprises for each dataset and each particular ranking of the plurality of rankings;

said highest ranking said percentage of the plurality of features comprises said highest ranking by the particular ranking;

said predicts said count of features of the plurality of features comprises predicts a respective count of features for each particular ranking of the plurality of rankings.

17. The one or more non-transitory computer-readable storage media of claim 11 wherein the regressor comprises a random forest.

18. The one or more non-transitory computer-readable storage media of claim 11 wherein a count of the plurality of datasets exceeds one hundred.

19. The one or more non-transitory computer-readable storage media of claim 11 wherein the plurality of meta-features values of each dataset of the plurality of datasets comprises at least one selected from the group consisting of:
- a count of the plurality of features that are numeric,
- a count of the plurality of features that are not numeric,
- a ratio of the count of the plurality of features to the count of samples in the dataset,
- a count of classes of samples in the dataset that the ML model can recognize,
- a minority count of samples in the dataset of a least frequent class of said classes,
- a majority count of samples in the dataset of a most frequent class of said classes, and
- a ratio of the minority count to the majority count.

20. The one or more non-transitory computer-readable storage media of claim 11 wherein the accuracy comprises: a precision, a recall, or an F score.

* * * * *